United States Patent Office 3,397,179
Patented Aug. 13, 1968

3,397,179
PURIFICATION OF CHLOROMETHYLAROMATIC POLYMERS BY PERCHLOROETHYLENE EXTRACTION
Harold H. Roth, Bay City, Mich., assignor to The Dow Chemical Company, Midland, Mich., a corporation of Delaware
No Drawing. Filed May 24, 1967, Ser. No. 640,809
6 Claims. (Cl. 260—47)

ABSTRACT OF THE DISCLOSURE

Low molecular weight chloromethylaromatic materials are removed from soluble essentially linear chloromethylaromatic polymers by extraction with perchloroethylene from an insoluble complex of the polymer and perchloroethylene.

Background

In U.S. Patent 3,248,279 Geyer uses water-soluble cationic (methylenediphenyl ether) polymers derived from chloromethyldiphenyl ether as wet-strength and electroconductive additives for cellulosic products. These cationic polymers are normally prepared by reacting a soluble intermediate chloromethyldiphenyl ether polymer with an appropriate amine or sulfide. Other soluble cationic polymers have been prepared from a soluble poly(vinylbenzyl chloride) or chloromethylated polystyrene, such as the quaternary ammonium salts described by Jones U.S. Patent 2,694,702 or Silvernail et al. U.S. Patent 3,011,918.

The activity of these cationic polymers is often detrimentally influenced by the presence of low molecular weight impurities including derivatives of unpolymerized monomer. To remove these materials, purification of the chloromethylaromatic polymer prior to conversion into the cationic form is often desirable. Conventional purification methods include precipitation of the polymer from a solution in a suitable non-polar organic solvent such as methylenechloride or 1,2-dichloroethane with methanol, isopropanol or other non-solvent. But in practice this process is complicated by the tendency of the precipitated polymer to become extremely sticky and difficult to handle.

Statement of the invention

A process has been discovered for removing low molecular weight chloromethylaromatic material from an essentially linear chloromethylaromatic polymer which comprises: (A) Blending the chloromethylaromatic polymer with sufficient perchloroethylene to form an insoluble complex of perchloroethylene and the chloromethylated aromatic polymer; (B) Extracting the low molecular weight chloromethylaromatic material from the insoluble chloromethylaromatic polymer-perchloroethylene complex with perchloroethylene.

General description

This process utilizes a novel complex of an essentially linear chloromethylaromatic polymer and perchloroethylene which forms and is stable at about 0–100° C., preferably about 20–40° C. Although insoluble in excess perchloroethylene, the complex is not sticky and blends or mixes readily with excess perchloroethylene in standard equipment thus permitting extraction of the lower molecular weight chloromethylaromatic impurities.

The nature of the perchloroethylene-chloromethylaromatic polymer complex is not known. As recovered from excess perchloroethylene at ambient temperature, the insoluble complex generally contains about 30–80 wt. percent perchloroethylene. Under similar conditions the same chloromethylaromatic polymers are soluble in methylene chloride, chloroform, 1,2-dichloroethane, 1,1,2-trichloroethylene, 1,1,2,2-tetrachloroethane and 1,1,2,2-tetrabromoethane.

The process is particularly suited for the purification of a soluble chloromethyldiphenyl ether polymer or for a soluble, essentially linear chloromethylated vinylaromatic polymer, particularly vinylaromatic polymers with a benzene nucleus such as chloromethylated polystyrene, polychlorostyrene and polyvinyltoluene.

It is also useful in removing unreacted vinylbenzyl chloride from a soluble polymer of vinylbenzyl chloride.

The insoluble perchloroethylene-chloromethylaromatic polymer complex is readily recovered from excess solvent by decantation, filtration or other similar methods. Then the purified polymer can be recovered from the perchloroethylene complex by stripping the perchloroethylene under reduced pressure or by other suitable means. Alternately the recovered complex can be dissolved in excess toluene, 1,2-dichloroethane, or other suitable organic solvent and then reacted with an organic amine, sulfide or other reagent to form the desired soluble cationic polymer.

The following examples illustrate further this invention. Unless otherwise specified, all parts and percentages are by weight.

Example 1.—Purification of poly(chloromethyldiphenyl ether)

(A) A chloromethyldiphenyl ether (CMDPE) containing 33.9 wt. percent Cl (3.05 $ClCH_2$—/DPE) was polymerized by the process of Geyer U.S. Patent 3,316,-186 using 1,2-dichloroethane as a solvent and stannic chloride as a catalyst to obtain an essentially linear poly-(chloromethyldiphenyl ether) soluble in 1,2-dichloroethane and containing 29.5 wt. percent Cl (2.38 $ClCH_2$—/DPE). Chromatographic analysis indicated that the polymer solution contained 31% unpolymerized CMDPE.

(B) A portion of the polymer solution was poured into vigorously stirred isopropanol to precipitate the polymer. The recovered solid polyCMDPE was washed thoroughly with 3 portions of isopropanol, air dried and reanalyzed by thin-layer chromatography. The unpolymerized CMDPE content had been reduced to 18.5% by the isopropanol treatment.

(C) An additional 50 parts of the polymer solution from 1A was added to 200 parts of perchloroethylene (1,1,2,2-tetrachloroethylene). A thin viscous phase was produced which redispersed with vigorous shaking. By stripping the 1,2-dichloroethane, a more viscous phase dispersed in perchloroethylene was obtained. The insoluble complex of polyCMDPE-perchloroethylene was separated and further extracted with 4 additional portions of perchloroethylene. 19.9 parts of a polyCMDPE-perchloroethylene complex containing 54.6% solids was obtained. This purified polymer contained less than 1% unpolymerized CMDPE.

(D) 20 parts of the partially purified polyCMDPE from 1B was added to about 160 parts of perchloroethylene giving a soft, easily dispersed, viscous phase. The excess perchloroethylene was decanted from the polyCMDPE-perchloroethylene complex. Another 160 parts of perchloroethylene was added and the complex became stiffer as it was kneaded with the fresh perchloroethylene. After 3 further extractions with perchloroethylene, 23.7 parts of a solid polyCMDPE-perchloroethylene, complex containing 48% solids was obtained. Analysis of the purified polyCMDPE by gel permeation chromatography established that the polymer contained less than 1% unpolymerized CMDPE and that dimeric and other low molecular weight chloromethyl-aromatic material was also removed by the perchloroethylene treatment.

(E) In another run about 125 parts of a 1,2-dichloroethane solution containing 43% polyCMDPE was mixed thoroughly with about 1600 parts of perchloroethylene. After removal of the insoluble polyCMDPE-perchloroethylene complex the perchloroethylene extract was found to contain 2.4% chloromethylaromatic materials. The extract was concentrated and analyzed by chromatography. The chloromethylaromatic material was identified as predominantly monomeric CMDPE with some dimeric CMDPE and only traces of higher molecular weight polyCMDPE.

In another run the recovered polyCMDPE-perchloroethylene complex was purified by extrusion as filaments into a bath of perchloroethylene.

(F) The purified polyCMDPE-perchloroethylene complexes as described in 1C–1E readily disperse in 1,2-dichloroethane, trichloroethylene, methylene chloride, methylchloroform, etc. and are converted into water-soluble cationic polymers by treatment with aqueous trimethylamine as described by Geyer U.S. Patent 3,316,186.

Example 2.—Purification of chloromethylated polystyrene

A mixture of 5 parts of a soluble, essentially linear chloromethylated polystyrene having an average molecular weight of about 40,000 and 5 parts of ethylbenzylchloride was added to about 160 parts perchloroethylene. The resulting soft, dispersible, viscous complex was recovered and blended with additional perchloroethylene. The purified solid polymer-perchloroethylene complex contained 30% solids and was essentially free of ethylbenzyl chloride.

I claim:
1. A process for removing low molecular weight chloromethylaromatic material from an essentially linear chloromethylated aromatic polymer which comprises:
   (A) Blending the chloromethylaromatic polymer with sufficient perchloroethylene to form an insoluble complex of perchloroethylene and the chloromethylaromatic polymer; and
   (B) Extracting the low molecular weight chloromethylaromatic material from the insoluble chloromethylaromatic polymer-perchloroethylene complex with perchloroethylene.

2. The process of claim 1 wherein the chloromethylaromatic polymer is a condensation polymer of chloromethyldiphenyl ether.

3. The process of claim 1 wherein the chloromethylaromatic polymer is a poly(vinylbenzyl chloride).

4. The process of claim 1 wherein the chloromethylaromatic polymer is a chloromethylated polyvinylaromatic.

5. The process of claim 1 wherein the chloromethylaromatic polymer has a solubility of at least 1 weight percent in 1,2-dichloroethane at 25° C.

6. The process of claim 1 wherein a solution of a condensation polymer of chloromethyldiphenyl ether in 1,2-dichloroethane is diluted with perchloroethylene to form an insoluble complex of the polymer and perchloroethylene and the unreacted chloromethyldiphenyl ether is extracted from the complex with additional perchloroethylene.

References Cited
UNITED STATES PATENTS 2,746,948    5/1956    Fetterly _____ 260—96.5

OTHER REFERENCES

Ketelaar et al., Rec. Trav. Chim., 71, 805–8 (1952).
Baker et al., J. Chem. Soc., 1956, 2010–17.

WILLIAM H. SHORT, *Primary Examiner.*

M. GOLDSTEIN, *Assistant Examiner.*